United States Patent [19]
Nohr et al.

[11] Patent Number: 6,062,355
[45] Date of Patent: May 16, 2000

[54] ENERGY-ABSORBING DEVICE

[75] Inventors: Matthias Nohr, Stuttgart; Franz Josef Bayer, Winnenden; Friedrich Werner, Wangen; Manfred Riegler, Oberasbach, all of Germany

[73] Assignee: ABB Daimler-Benz Transportation (Technology) GmbH, Berlin, Germany

[21] Appl. No.: 09/066,754

[22] Filed: Apr. 27, 1998

[30] Foreign Application Priority Data

Apr. 25, 1997 [DE] Germany .................. 197 17 473

[51] Int. Cl.⁷ .................................................. F16F 7/12
[52] U.S. Cl. .................. 188/374; 188/371; 188/376; 188/377
[58] Field of Search ............................ 188/371, 377, 188/374, 376; 267/139; 293/132

[56] References Cited

U.S. PATENT DOCUMENTS

| | | | |
|---|---|---|---|
| 3,624,764 | 11/1971 | Goben | 188/377 |
| 5,074,391 | 12/1991 | Rosenzweig | 188/377 |

FOREIGN PATENT DOCUMENTS

| | | |
|---|---|---|
| 3 38 33 048 A1 | 4/1990 | Germany . |
| 296 02 072 U1 | 3/1996 | Germany . |
| 196 27 061 C2 | 11/1996 | Germany . |
| 1215193 | 12/1970 | United Kingdom . |

Primary Examiner—Christopher P. Schwartz
Assistant Examiner—Devon Kramer
Attorney, Agent, or Firm—Venable; George H. Spencer; Gabor Kelemen

[57] ABSTRACT

An energy-absorbing device, particularly for rolling stock to provide protection therefor when potentially damaging impact occurs, includes first and second tubular elements which are fitted into one another and which are of unlike material.

16 Claims, 2 Drawing Sheets

ENERGY-ABSORBING DEVICE

CROSS REFERENCE TO RELATED APPLICATION

This application claims the priority of German Application No. 197 17 473 filed Apr. 25, 1997, which is incorporated herein by reference.

BACKGROUND OF THE INVENTION

The invention relates to an energy-absorbing device, particularly for rolling stock.

Energy-absorbing devices are used in vehicle technology for taking up kinetic energy, for example, upon a damaging impact caused by colliding with an obstruction. During such an occurrence, the energy is absorbed in a controlled manner by parts that are especially provided on the vehicle for such a purpose.

In order to introduce new safety features in rolling stock, for example, in the frontal area of a locomotive, deforming regions must be provided which, in view of the enormous mass of the train, are capable of absorbing high amounts of energy. In particular the engineer's cabin must be sufficiently protected during an impact. The space required for such a purpose, however, is severely limited at such a location so that ideally an existing construction should be used for installing an energy-absorbing device. The rigid parapet region in particular provides hollow-chamber profiles with varied profile cross sections and a high bending moment of inertia, which can only be used, however, if the dimensions of the energy-absorbing device can be adapted for installation. The energy-absorption device may also be used in aviation, for example, in helicopters, where it may be installed in the seat to protect the pilot if hard impact occurs.

Steel tubes which absorb the energy by folding, tapering or by means of a rolling bending are known and are described in current text books such as Lang, K., Manual for the Metal Forming Technology, (1975), Vol. 3, p. 211 ff and the Encyclopedia for Materials Technology, VDI Press (1991), p. 1858 ff. Further, French Published Patent Application 2 698 034 A1 and U.S. Pat. No. 4,829,979 disclose, for a similar purpose, tubes made of a fiber-reinforced plastic, which absorb energy by fiber/matrix breakages.

A comparison of the various materials as to their energy-absorbing property shows that plastics are far superior to metals. However, plastic materials have the disadvantage in practice that force-locking connections with other components can be made only with very significant expenditure, if at all.

SUMMARY OF THE INVENTION

It is an object of the invention to provide an improved energy-absorbing device which can absorb a large amount of energy applied, for example, to vehicles and is of varied construction.

This object and others to become apparent as the specification progresses, is accomplished by the invention, according to which, briefly stated, the energy-absorbing device, particularly for rolling stock to provide protection therefor when potentially damaging impact occurs, includes first and second tubular elements which are fitted into one another and which are of unlike material.

It is an essential advantage of the invention that by utilizing metal for one of the tubular elements, it is possible to make a force-locking flange connection to the hollow-chamber profiles in a simple manner. By inserting the tubular elements of unlike material—usually a plastic tube and a metal tube—into one another, it is possible to take up high amounts of energy. In such an arrangement the metal tube and the plastic tube—which, for example, surrounds the metal tube—will stabilize each other in case of damaging impact, so that on the one hand, the buckling stability of the metal tube is increased by the plastic tube and the flow properties during the deformation are improved and, on the other hand, the plastic tube is guided accurately by the metal tube.

Another essential advantage resides in that it is possible in a simple way to adapt the structural design to the predetermined component geometries of the carrier elements owing to the varied wall thickness and cross section of the metal and plastic tubes. This results in an optimal use of the existing hollow spaces in the carrier elements.

DESCRIPTION OF THE PREFERRED EMBODIMENTS

Figure 1:
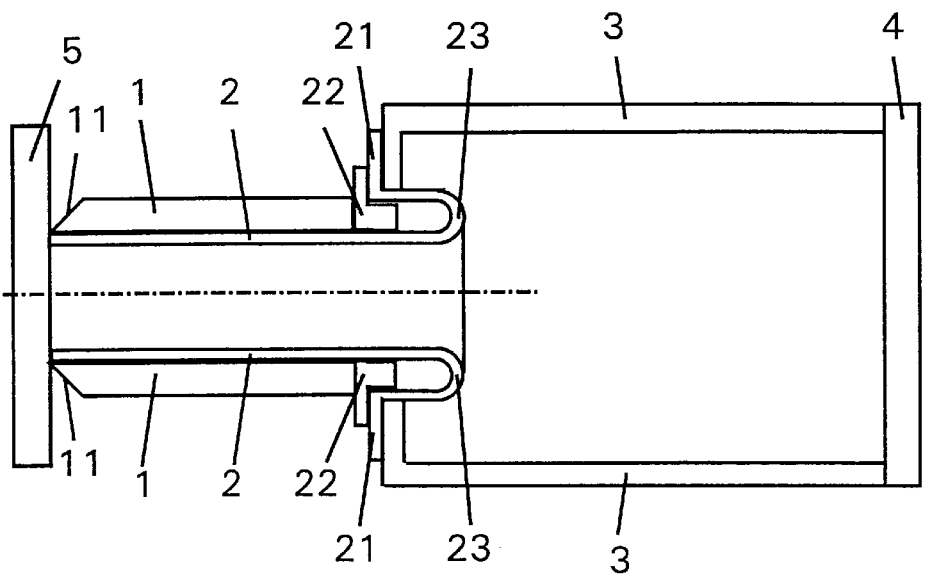
FIG. 1 is a sectional side elevational view of a first preferred embodiment having an internal metal tube.

The energy-absorbing device shown in FIG. 1 has an outer plastic tubular element 1 which is attached, for example, to a parapet carrier 3 by a connecting flange 21 of an inner, metal tubular element 2. A guide element 22 is used at the flange or as a part thereof to ensure that the tubular element 2 is guided in a straight line during a deformation. The tubular element 1 is fitted over the tubular element 2 up to the guide element 22 and is supported by the tubular element 2 without being additionally attached. Upon damaging impact, the impact force is transmitted via the guide element 22 to the flange 21 and the parapet carrier 3. At its end the tubular element 1 has a "trigger" 11 which may be wedge-shaped and which contacts an impact plate 5 attached to the tubular element 2. The trigger 11 is inserted purposely as starting point for the breakage in the tubular element 1. Upon damaging impact, the tubular element 1 breaks off progressively, starting at the trigger 11. The impact plate 5 ensures an even introduction of the force into both tubular elements 1 and 2. The energy is absorbed by the tubular element 2 via the deformation region 23 in a progressive "rolling-off" motion of the tube, while the energy is absorbed by the tubular element 1 by the breakage of a progressive breakage zone which is provided for this purpose and which starts at the trigger 11.

Figure 2:
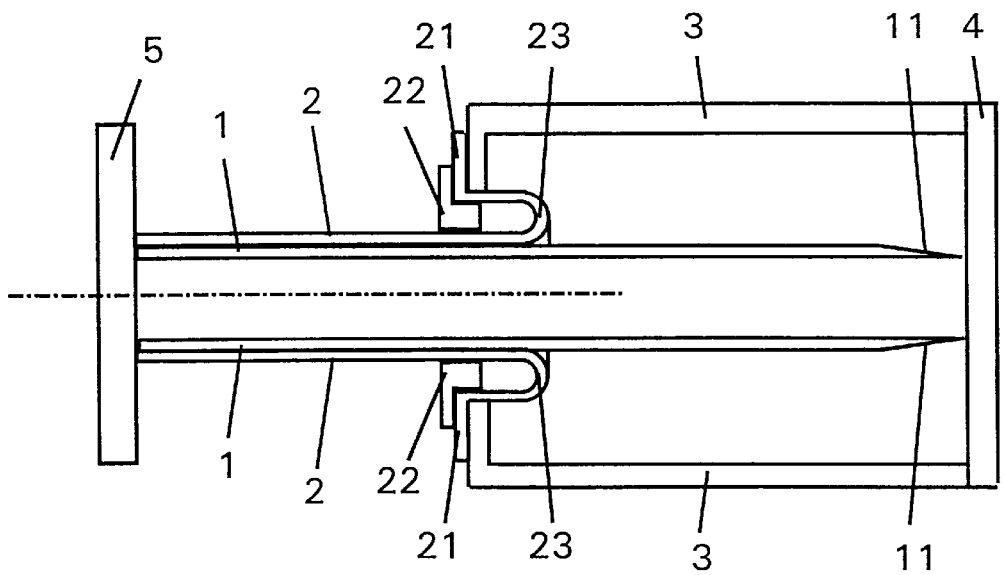
FIG. 2 is a sectional side elevational view of a second preferred embodiment having an external metal tube and illustrated before impact.
Figure 3:
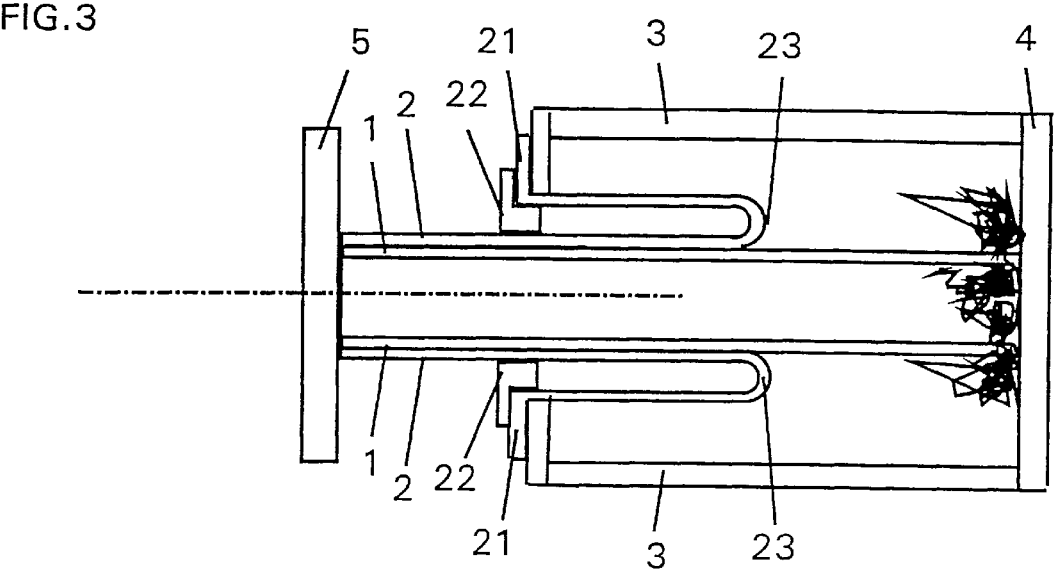
FIG. 3 is a sectional side elevational view of the second preferred embodiment illustrated after impact.

In second embodiment according to FIG. 2 the energy-absorbing device has a metal tubular element 2 which surrounds the plastic tubular element 1. The trigger 11 forming part of the tubular element 1 is located inside the parapet carrier 3, at a support wall 4. FIG. 3 shows the progression of breakage when damaging impact occurs. Starting with the trigger 11, the tubular element 1 progressively breaks off at the support wall 4. It is an advantage of this arrangement that the material that breaks off remains inside the hollow space of the parapet carrier 3. The rolling bending of the tubular element 2 is deliberately controlled by the guide element 22 and the inner tubular element 1. Owing to the fact that the tubular elements 1 and 2 have unlike thicknesses, it is possible to control the force transmission in a purposeful way to the individual elements of the parapet carrier 3. If, for example, the support 4 cannot be realized for structural reasons, then the FIG. 1 solution where the metal tubular element 2 is on the inside can be readily used instead.

Figure 4:
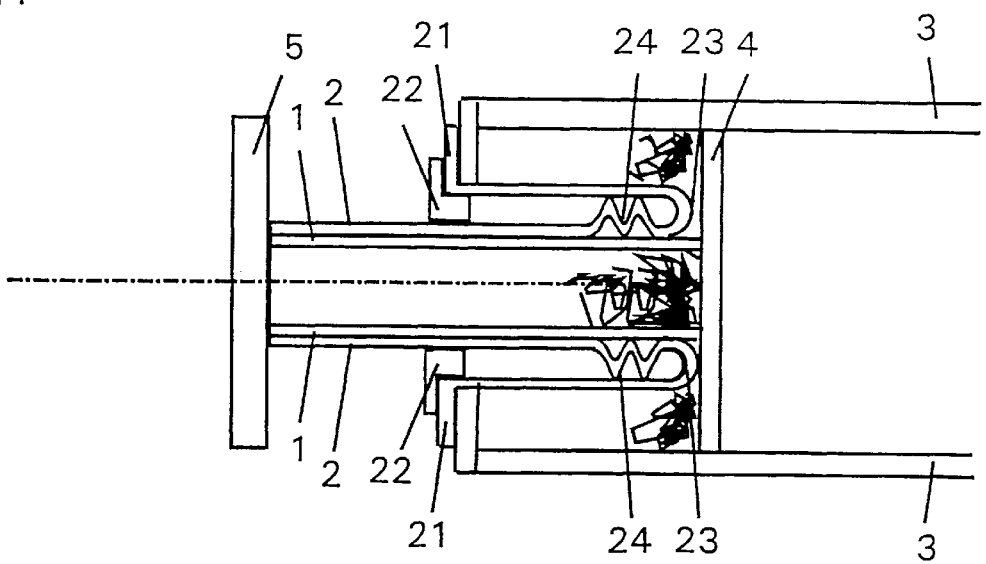
FIG. 4 is a sectional side elevational view of a third preferred embodiment having an external metal tube and illustrated after impact.

FIG. 4 illustrates a further embodiment of an energy-absorbing device in which the metal tubular element 2 is adapted for particularly high energy-absorption. In the zone 24 a further deformation is added to the rolling deformation; such an additional deformation is effected by a multiple buckling of the metal. In this arrangement either the support wall 4 is installed offset toward the front as shown, or the energy-absorbing device travels long deformation paths.

The tubular element 1 may be of a plastic and/or ceramic material or composite material formed of a laminate and a matrix. The laminate may be fiber glass, carbon fiber, natural fiber, synthetic fiber material or a combination thereof. The matrix may be a Duroplast or a thermoplast. The tubular element 2 may be of metal, such as a steel alloy or an aluminum alloy.

The invention is not limited to the described embodiments; rather, it encompasses other types of deformation of the metal tubular element 2, such as a looping deformation which may develop by means of a partial foaming of the hollow space in the carrier.

It will be understood that the above description of the present invention is susceptible to various modifications, changes and adaptations, and the same are intended to be comprehended within the meaning and range of equivalents of the appended claims.

What is claimed is:

1. An energy absorbing device comprising:

first and second tubular elements fitted into one another and being of unlike material;

one of said elements being constructed of a rolling deformable metallic composition;

said element constructed of rolling deformable metallic construction having a flange for securement to a rigid frame at one end of said metallic tubular element;

a guide element positioned around said metallic tubular element for guiding said metallic tubular element in a rolling deformation thereof upon application of energy; and an impact plate attached to said first and second hollow tubular elements for transmitting energy from said impact plate to said first and second hollow tubular elements.

2. An energy-absorbing device, in combination with a parapet carrier, said energy-absorbing device comprising:

first and second tubular elements fitted into one another and being of unlike material; said parapet carrier having an inner space and a supporting end wall bounding said inner space; said second tubular element being attached to said parapet carrier and being positioned partially inside and partially outside said inner space; said first tubular element being fitted into said second tubular element and being positioned partially inside and partially outside said inner space; said first tubular element having an end portion formed as a trigger at which deformation starts upon application of energy to said device; said trigger adjoining said supporting end wall; wherein said first tubular element can be pushed into and breaks up at said supporting end wall upon application of energy and said second tubular element has an end provided with a flange for securement to said parapet carrier; said second tubular element further having a guide element for guiding said second tubular element in a rolling deformation thereof upon application of the energy.

3. An energy-absorbing device comprising: first and second tubular elements fitted into one another and being of unlike material; and an impact plate attached to said first and second tubular elements for transmitting energy from said impact plate to said first and second tubular elements; said first tubular element having an end portion formed as a trigger at which deformation starts upon application of energy to said impact plate; said trigger adjoining said impact plate; wherein said first tubular element can be pushed into and breaks up at said impact plate upon application of energy to said impact plate and said second tubular element has an end provided with a flange for securement to a rigid frame; said second tubular element further having a guide element for guiding said second tubular element in a rolling deformation thereof upon application of the energy.

4. The energy-absorbing device as defined in claim 1, wherein said first tubular element comprises a trigger portion at which deformation starts upon application of energy to said device.

5. The energy-absorbing device as defined in claim 1, wherein said first tubular element is one of plastic and ceramic.

6. The energy-absorbing device as defined in claim 5, wherein said first tubular element is of a composite material.

7. The energy-absorbing device as defined in claim 4, wherein said composite material is a fiber composite material formed of a laminate and a matrix.

8. The energy-absorbing device as defined in claim 7, wherein said laminate is selected from the group consisting of fiber glass, carbon fiber, natural fiber, synthetic fiber material and a combination thereof.

9. The energy-absorbing device as defined in claim 7, wherein said matrix is one of a Duroplast and a thermoplast.

10. The energy-absorbing device as defined in claim 1, wherein said metal is selected from the group consisting of a steel alloy and an aluminum alloy.

11. The energy-absorbing device as defined in claim 1, wherein said second tubular element includes means for effecting one of a rolling deformation, a buckling deformation and a looping deformation of said second tubular element upon application of energy.

12. The energy-absorbing device as defined in claim 1, wherein said first tubular element is fitted into said second tubular element.

13. The energy-absorbing device as defined in claim 1, wherein said second tubular element is fitted into said first tubular element.

14. The energy-absorbing device as defined in claim 1, wherein one of said tubular elements has a reduced cross-sectional trigger portion comprising one end of one of the tubular element at which deformation starts upon the application of energy.

15. The energy-absorbing device as defined in claim 1, wherein said impact plate is attached to an end opposite said flange.

16. The energy-absorbing device as defined in claim 1, wherein the first and second tubular elements are of unlike thicknesses.

* * * * *